Figure 1:
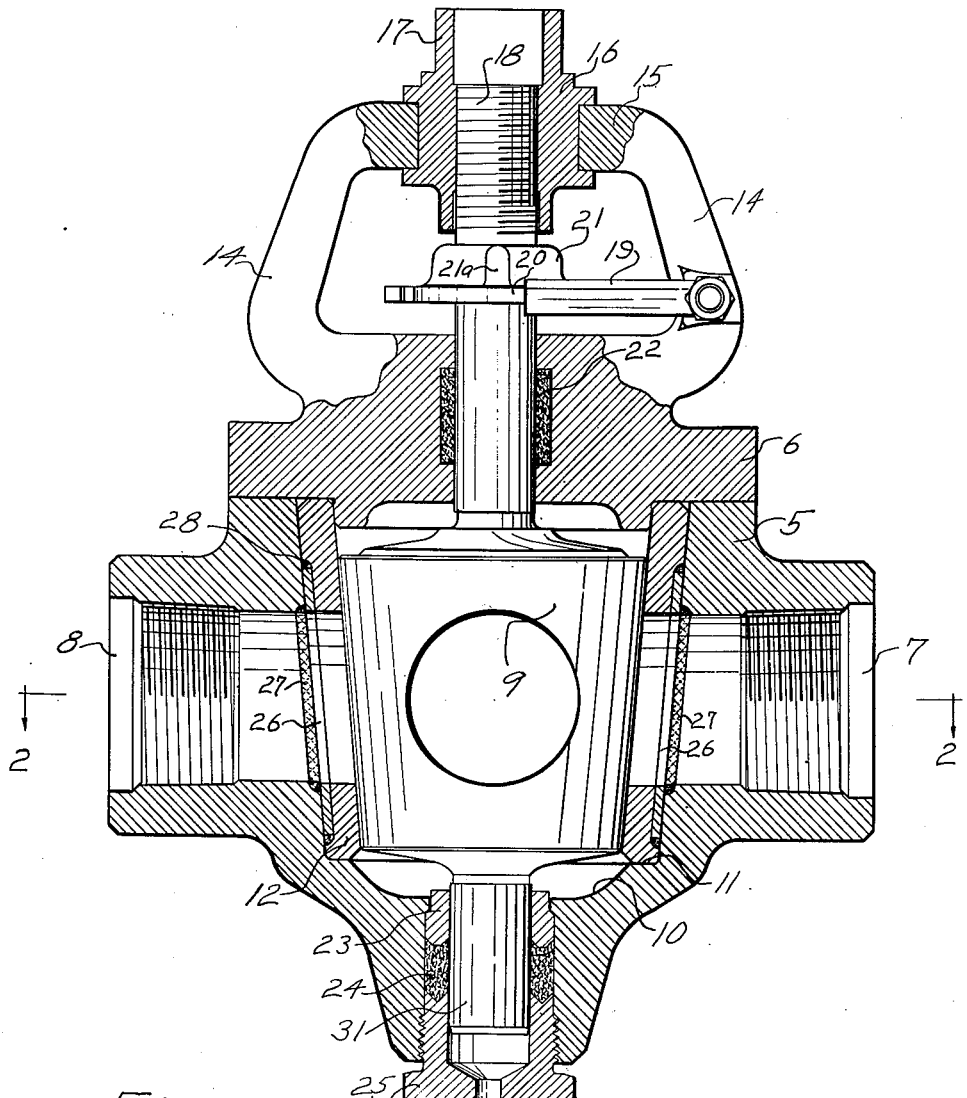

July 10, 1951　　　H. ALLEN ET AL　　　2,559,695
PLUG TYPE VALVE AND SEAL THEREFOR

Filed Dec. 3, 1949　　　　　　　　　　　　　2 Sheets-Sheet 1

HERBERT ALLEN
GALE E. NEVILL
*INVENTOR.*

BY Browning & Simms

ATTORNEYS

July 10, 1951 H. ALLEN ET AL 2,559,695
PLUG TYPE VALVE AND SEAL THEREFOR
Filed Dec. 3, 1949 2 Sheets-Sheet 2
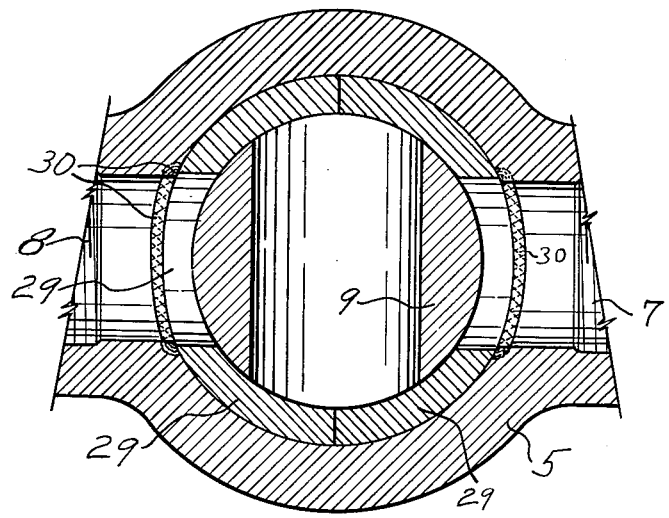
Fig. 4
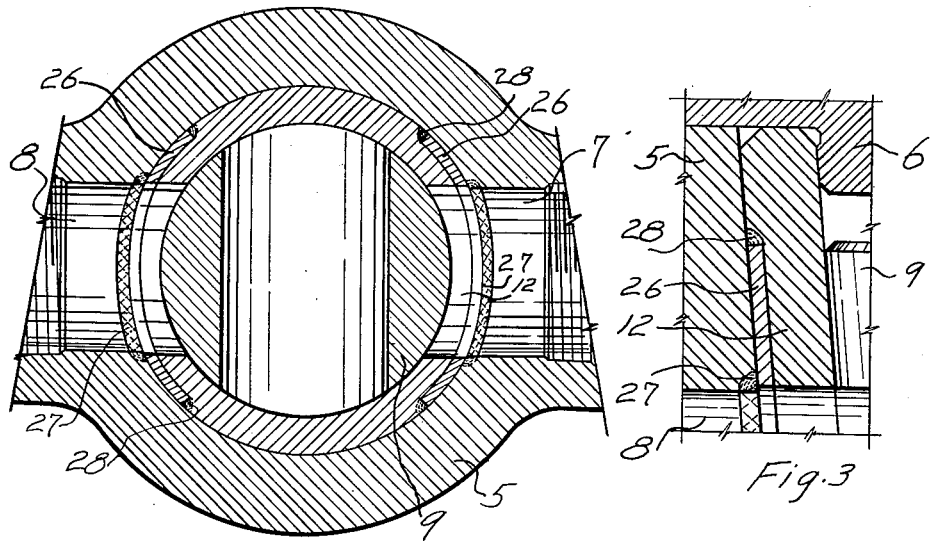
Fig. 2
Fig. 3
HERBERT ALLEN
GALE E. NEVILL
  INVENTOR.
BY
Browning & Simms
  ATTORNEYS Patented July 10, 1951

2,559,695

UNITED STATES PATENT OFFICE 2,559,695

PLUG TYPE VALVE AND SEAL THEREFOR

Herbert Allen and Gale E. Nevill, Houston, Tex., assignors to Cameron Iron Works, Inc., Houston, Tex., a corporation of Texas Application December 3, 1949, Serial No. 130,971

11 Claims. (Cl. 251—113)

This invention relates to improvements in valves and seals therefor and refers more particularly to the sealing arrangement in plug type valves used for controlling fluids under high pressures.

It has been found that where high pressure fluids are to be controlled a more efficient seal can be obtained when the seat is formed on a separate liner member which is carried within the valve body. A more perfect seal can be obtained between the seat surface and the valve element than where the seat surface is formed upon the valve body as an integral part. This is due to the fact that the high pressures cause the body to distort but does not cause a corresponding distortion in the seat surface. In fact it has been found that these high pressures may actually be utilized to perfect the seal between the liner seat and the plug valve member. However, where the separate liner is employed it is necessary to seal between the liner and the valve body upon the downstream side of the plug valve member and encircling the flow passage. The usual resilient packing material such as rubber, synthetic rubber, plastic packing and the like, have been employed for this use with considerable degree of satisfaction under low temperature conditions and where handling types of fluids that do not deleteriously affect the packing material. When the temperatures of the fluids handled approach 300° F. these usual packing materials are not satisfactory and where the usual packing materials are not suitably resistant to the products to be handled, of course they are not satisfactory regardless of the temperature range.

One of the objects of this invention is to provide in a valve, a seal between the seat member and the valve body employing material having chemical, thermal and mechanical properties approximately equal to those of the trim material.

An object of this invention is to provide in a valve of the class described, a seal arrangement which will be capable of handling fluids under high pressures and at high temperatures.

Another object is to provide a valve of the class described which may be employed for handling fluids of higher temperatures than heretofore possible and for handling many types of fluids that could not be satisfactorily handled in this class of valve heretofore.

A further object is to provide in a valve of the class described for a welded sealing means between the liner seat and valve body.

Still another object is to provide in a valve of the class described a resilient washer for sealing between the liner seat and valve body which may be welded to the liner and body providing a resilient seal therebetween which permits the pressure differential of the line fluids across the closed valve member to urge the liner against the valve member.

Another object is to provide a valve of the class described wherein the seat is sealingly welded to the body near the downstream side of the valve member thus enabling differential fluid pressure to urge the seat toward the valve member.

Still another object is to provide in a valve of the class described a welded resilient connection between the liner seat and the valve body with a portion of the liner seat up-stream of this connection which is urged toward the valve member by the differential pressure controlled.

Other and further objects of the invention will appear as this description proceeds.

In the accompanying drawings which are to be read in conjunction herewith as constituting a part of the instant specification and wherein like reference numerals are used in the various views to indicate like parts:

Fig. 1 is a vertical sectional view through the flow passage of a valve embodying this invention, Fig. 2 is a view taken along the line 2—2 in Fig. 1 in the direction of the arrows, Fig. 3 is a fragmentary view on an enlarged scale illustrating the preferred seal of this invention as shown in Figs. 1 and 2, and Fig. 4 is a view similar to Fig. 2 but illustrating a modified seal arrangement in accordance with this invention.

Referring to Fig. 1 of the drawing, there is shown a plug type valve wherein the plug valve member, upon actuation of the valve either to open or close it, is first moved from the valve seat, then rotated to new operational position, and then reseated. The novel seal arrangement of this invention is particularly of advantage when used in this type of valve where the plug valve member, upon actuation, is moved from its seat.

Considering the details of construction of the valve, the housing is made up of two parts, a body 5 and a bonnet 6. The body has a flow passage therethrough with fittings 7 and 8 adapted to connect the valve in a flow line. The valve is of such construction that flow may take place through it in either direction and still be under the control of the plug valve member 9. The flow passage is interrupted intermediate its ends with an enlarged recess 10 formed in the body having an annular shoulder 11 against which a liner or seat member 12 is positioned with bonnet 6 retaining the seat member in this position. The liner is not jammed against the taper of recess 10 but has a slight clearance, too slight to appear in the drawings, which permits the liner to be rotated by hand before it is welded to the body as will be hereinafter described. This clearance permits free access of line fluid between the body and liner. The bonnet may be secured to the housing in any suitable fashion as by cap screws not shown in the drawings.

The liner is of relatively rigid construction adapted to withstand the normal pressure differentials to be encountered in service with but only very slight distortion under the influence of these pressures. The inner surface of the liner is tapered and provides a seat surface for the plug valve member 9, the outer periphery of which is similarly tapered. The actuating mechanism for the plug valve member will be next described after which the novel seal between the liner 12 and body will be explained.

The actuator for the valve may be of any type which moves the valve member from its seat, rotates the valve member and then reseats the valve member. This type of actuation is very desirable for plug type valves because of the tendency for the plug valve member to stick to the seat between periods of actuation. The initial movement of the plug valve member away from the seat breaks the stuck valve member loose after which it may be readily rotated to a new operational position and then reseated.

A good number of actuators have been designed which will accomplish this function and the one shown in the drawing has been found to be entirely satisfactory. This mechanism includes risers 14 secured at their lower end to bonnet 6 and having an annular bearing 15 at its upper end. A bushing 16 is journaled within bearing 15 for rotation therein and has an end 17 which is out of round on its outer periphery for receiving a wrench, handwheel, or the like. The bushing 16 has a threaded interior which receives the threaded end of stem 18 extending from the plug valve member.

Upon rotation of bushing 16, with the valve plug member stuck in its seat, the threaded connection between the bushing and stem 18 will impart an endwise movement to the stem which will break the valve member from its frozen position within the liner. Additional rotation will then cause the stem 18 and plug valve member to rotate because of the friction within the threaded connection and this direction of rotation is continued until the plug valve member has assumed a new operational position from a rotation standpoint. Then the direction of rotation of bushing 16 is reversed but spring pawl 19, secured at one end to one of the risers, engages ratchet teeth 20 on ratchet holder and indicator 21 to prevent reverse rotation of the plug valve member except within the limits of the four ratchet teeth so that the threaded engagement between stem 18 and bushing 16 causes the valve member to reseat. The part 21 may have an indicator 21a aligned with the flow passage through the plug valve member in order to indicate to the operator the rotational position of the plug valve member passage.

Stem 18 extends through a suitable stuffing box arrangement, shown schematically in the drawings at 22 to seal between the stem and bonnet, and at the other end of the plug valve member a stem extension 31 is journaled in a suitable stuffing box arrangement including shoulder bushing 23, packing 24, and gland 25 threaded in the lower end of the body.

Considering the liner 12 and its seal with the body 5 the preferred arrangement is shown in Figs. 1, 2, and 3, and includes a washer 26 which is relatively thin compared to the thickness of liner 12 and is very flexible as compared with the liner. This washer 26 encircles the flow passage and resides in a groove formed in the joint between the body and liner. The groove preferably is formed in the face of the liner which confronts the body. The washer is welded as at 27 to the valve body the welding being adjacent the edge of the washer formed by the opening in the washer. The washer is welded adjacent its outer edge to the liner as shown at 28. Thus there has been provided a welded sealing means between the liner and body and this sealing means is very flexible as compared to the liner.

In the modified form shown in Fig. 4, the liner is shown as made up in a plurality of parts, it being divided upon a plane normal to the flow passage through the valve. However, it will be noted that the ends of the liner parts are in abutment so that the liner in effect serves as an integral unit. It is to be understood that the one or two part linear arrangement may be used interchangeably in either of the modifications shown in the drawings. In this arrangement the seal washer 26 has been dispensed with and the welded sealing means constitutes a welded union between the liner part 29 and the body 5 as shown at 30. This welded seal means is not as efficient as the one shown in Figs. 1, 2, and 3, because it is more rigid and does not have the flexibility of the other arrangement but it has been found to be satisfactory for most purposes in service and does have the advantage of being less expensive than the preferred arrangement.

It is believed that the assembly of the valve will be apparent from the foregoing description, with the possible exception of the preferred seal arrangement of the Fig. 1 modification. The washers 26 are fitted in the grooves in the liner periphery while the liner is out of the valve body and are welded in place. These welds are then smoothed out while the plug is given its final machining. After the final machining the liners are then assembled with the plug valve body 5 and the washers are welded thereto. Of course, in the Fig. 4 modification the liner parts are finally machined and then placed in the valve body, at which time they are welded to the body about the flow passage.

In operation, the valve member 9 is, of course, shifted between open and closed positions by actuation of the bushing 16 in a manner which it is believed is apparent from the foregoing description. When the passage through the plug valve member 9 is aligned with the fittings 7 and 8, of course the passage through the valve is complete to permit flow therethrough. When the passage through the plug valve member 9 is in the position shown in Fig. 1, the valve is in closed position and the seal between the plug valve member and the liner 12 actually takes place on the downstream side of the plug valve member.

Where high pressures are encountered the plug valve body 5 is distorted due to its irregular inner contour but the high pressure to be controlled is exerted exteriorly of the liner and forces it against the plug valve member. Of course the weld between the washer 26 and valve body and the weld 28 between the washer and the liner seals off the flow passage and prevents leakage of fluid into the flow passage downstream from the liner and valve member. Substantially the downstream pressure will be reflected between the liner and plug valve member immediately surrounding the downstream opening in the liner and the pressure differential across the liner urges the liner and plug valve member toward one another and even though the liner is of relatively rigid construction nevertheless it will be distorted to a slight extent in a direction to cause a firmer seating between the plug valve member and the liner. The relative thinness of the washer 26 as compared to the liner makes it very flexible whereby the pressure differential causes it to collapse into firm seating engagement with the liner which backs up the washer and prevents undue distortion or rupture of it.

Due to the integral character of the liner it cannot move inwardly toward the plug and it is sufficiently rigid to retain its shape and position when the plug valve member is lifted from the seat. Thus, even though the valve is stuck in the seat and considerable force is required to break it loose, nevertheless the liner remains in place.

It is preferable in valves of this character to fabricate them with the liner sealed to the body about both openings of the liner in order that the valve may be employed to control flow in either direction, but it is contemplated that this is not required and that only a single seal may be required.

In the modification of Fig. 4, the seal operates in substantially the same fashion as that shown in Figs. 1, 2, and 3, but of course the weld 30 does not have the flexibility of the washer 26 and the other modification. However, it is to be understood that the distortion of the relatively rigid liner parts is actually only a very small fraction of an inch and that very little flexibility is required.

It will be seen that the objects of this invention have been accomplished. There has been provided a plug valve having a seal provided by welding means between the liner seat and the valve body and encircling the flow passage. The arrangement is such that the valve may be used under elevated temperature conditions beyond the temperature range with which rubber, synthetic rubber, and like packing arrangements could be employed. The construction is such that distortion of the valve body due to high pressure differentials controlled by the valve does not interfere with proper sealing between the plug valve member and the liner seat, but actually enhances the sealing qualities of the valve. The character of the seal between the liner and the body is such that many types of fluids may be handled which have deleterious effect upon the types of packing heretofore used in this class of valves. The arrangement is such that when the valve member is lifted from its seat, the liner remains in position and does not tend to follow the plug valve member.

From the foregoing it will be seen that this invention is well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a plug type valve, a body with a flow passage therethrough formed with a recess intermediate its ends, a liner positioned within the recess with openings aligned with the flow passage, a seat surface upon the liner, a plug valve member cooperable with the seat surface for controlling the flow passage, said valve member mounted within the body for movement between open and closed positions, and a sealing means welded between the body and liner encircling the flow passage and liner opening.

2. In a plug type valve, a body with a flow passage therethrough formed with a recess intermediate its ends, a liner positioned within the recess with openings aligned with the flow passage, a tapered seat surface upon the liner, a tapered plug valve member cooperable with the seat surface for controlling the flow passage, said valve member mounted within the body for movement between open and closed positions, and a metallic sealing means welded between the body and liner encircling the flow passage and liner opening.

3. The combination of claim 2 wherein the liner is divided on a plane substantially normal to the flow passage.

4. In a plug type valve, a body with a flow passage therethrough formed with a recess intermediate its ends, a liner positioned within the recess with openings aligned with the flow passage, a tapered seat surface upon the liner, and a tapered plug valve member cooperable with the seat surface for controlling the flow passage, said valve member mounted within the body for movement between open and closed positions, said liner at one opening sealingly welded to the body.

5. In a plug type valve, a body with a flow passage therethrough formed with a recess intermediate its ends, a liner positioned within the recess with openings aligned with the flow passage; a seat surface upon the liner; a plug valve member cooperable with the seat surface for controlling the flow passage, said valve member mounted within the body for movement between open and closed positions; and a seal washer, flexible relative to the liner, positioned between the liner and body to encircle one liner opening, said washer being welded adjacent one edge to the body and being welded adjacent its other edge to the liner.

6. In a plug type valve, a body with a flow passage therethrough formed with a recess intermediate its ends; a liner positioned within the recess with openings aligned with the flow passage; a seat surface upon the liner; a plug valve member cooperable with the seat surface for controlling the flow passage, said valve member mounted within the body for movement to shift the valve member between open and closed positions; and a seal washer, flexible relative to the liner, positioned between the liner and body in a groove formed in one of these, said seal washer encircling one liner opening, said washer being welded adjacent one edge to the body and being welded adjacent its other edge to the liner.

7. As a subcombination a valve body with a flow passage therethrough formed with a recess intermediate its ends, a liner positioned within the recess with openings aligned with the flow passage, and a metallic sealing means welded between the body and liner encircling the flow passage and the downstream one of the liner openings.

8. The combination of claim 7 wherein the liner is divided on a plane substantially normal to the flow passage and the ends of the liner parts abut.

9. As a subcombination a valve body with a flow passage therethrough formed with a recess intermediate its ends and a liner positioned within the recess with openings aligned with the flow passage, said liner at one opening sealingly welded to the body.

10. As a subcombination a valve body with a flow passage therethrough formed with a recess intermediate its ends, a liner positioned within the recess with openings aligned with the flow passage, and a seal washer, flexible relative to the liner, positioned between the liner and body and encircling the liner opening downstream of the liner, said washer welded adjacent one edge to the body and welded adjacent its other edge to the liner.

11. As a subcombination a valve body with a flow passage therethrough formed with a recess intermediate its ends; a liner positioned within the recess with openings aligned with the flow passage; and a seal washer, flexible relative to the liner, positioned between the liner and body in a groove formed in one of these and encircling the downstream one of the liner openings, said washer welded adjacent one edge to the body and welded adjacent its other edge to the liner.

HERBERT ALLEN.
GALE E. NEVILL.

No references cited.